(12) United States Patent
Raphel et al.

(10) Patent No.: US 6,833,040 B2
(45) Date of Patent: Dec. 21, 2004

(54) APPARATUS AND METHOD FOR HANDLING MEMBRANES

(75) Inventors: Aaron Raphel, Somerville, MA (US); Enoch Kim, Boston, MA (US); Emanuele Ostuni, Cambridge, MA (US); Gregory Kirk, Winchester, MA (US); Olivier Schueller, Somerville, MA (US)

(73) Assignee: Surface Logix Inc., Brighton, MA (US)

( * ) Notice: Subject to any disclaimer, the term of this patent is extended or adjusted under 35 U.S.C. 154(b) by 105 days.

(21) Appl. No.: 10/033,863

(22) Filed: Dec. 19, 2001

(65) Prior Publication Data

US 2003/0111167 A1 Jun. 19, 2003

(51) Int. Cl.$^7$ .......................... B44C 1/00; B32B 31/22; B29C 41/34; B41C 1/14; B41M 1/17
(52) U.S. Cl. ................. 156/230; 156/242; 156/247; 264/299; 101/128.4; 101/129
(58) Field of Search ............................. 101/378, 128.4, 101/129; 156/230, 231, 232, 241, 242, 247; 264/299, 330; 427/96, 146, 147, 148, 149, 162, 261; 428/195.1, 411.1, 914, 195

(56) References Cited

U.S. PATENT DOCUMENTS

| | | | | |
|---|---|---|---|---|
| 4,378,953 A | * | 4/1983 | Winn | ......................... 359/894 |
| 4,748,124 A | | 5/1988 | Vogler | |
| 4,802,945 A | * | 2/1989 | Opina | ......................... 156/247 |
| 5,147,397 A | * | 9/1992 | Christ et al. | ................ 623/6.46 |
| 5,512,131 A | | 4/1996 | Kumar et al. | |
| 5,576,125 A | | 11/1996 | Bih | |
| 5,776,748 A | | 7/1998 | Singhvi et al. | |

OTHER PUBLICATIONS

Ostuni et al., "Patterning Mammalian Cell Using Elastomewric Membranes", Langmuir, Jun. 21, 2000.*
Copy of International Search Report.
Laurent Libioulle et al., "Contact–Inking Stamps for Microcontact Printing of Alkanethiols on Gold", Langmuir, 1999, 15, 300–304.
David C. Duffy et al., "Patterning Eletroluminescent Materials with Feature Sizes as Small as 5 μm Using Elstomeric Membranes as Masks for Dry Lift–Off", Advanced Materials, 1999, 11 No. 7.
Christopher S. Chen et al, "Using Self–Assembled Monolayers to Pattern ECM Proteins and Cells on Substrates", Methods in Molecular Biology, vol. 139.
Albert Folch, and Mehmet Toner, "Microengineering of Cellular Interactions", Annual Review of Biomedical Engineering, vol. 2, 2000.
Emanuele Ostuni et al., "Patterning Mammalian Cells Using Elastomeric Membranes", Langmuir, Jun. 21, 2000.
Rebecca J. Jackman et al., "Using Elastomeric Membranes as Dry Ressits and for Dry Lift–Off", Langmuir 1999, 15 2973–2984.
Albert Folch et al., "Microfabricated elastomeric stencils for micropatterning cell cultures", John Wiley & Son, Inc. Mar. 9, 2000, 346–353.

* cited by examiner

Primary Examiner—J. A. Lorengo
(74) Attorney, Agent, or Firm—Kenyon & Kenyon

(57) ABSTRACT

A method for applying a pattern to a target surface includes the steps of applying a coating of membrane material over a selected portion of a substrate. The substrate imparts a pattern to the membrane material corresponding to a pattern to be applied to the target surface. A support member is positioned in contact with an outer portion of the membrane material. The support member has a higher rigidity than the membrane material. The method may also combine the steps of curing the membrane material to bond the support member to the membrane. When bonded to the membrane, the support member maintains at least a portion of the membrane in a substantially taut condition to prevent a portion of the membrane from folding onto itself. The membrane is then employed to impart the pattern to the target surface.

30 Claims, 7 Drawing Sheets

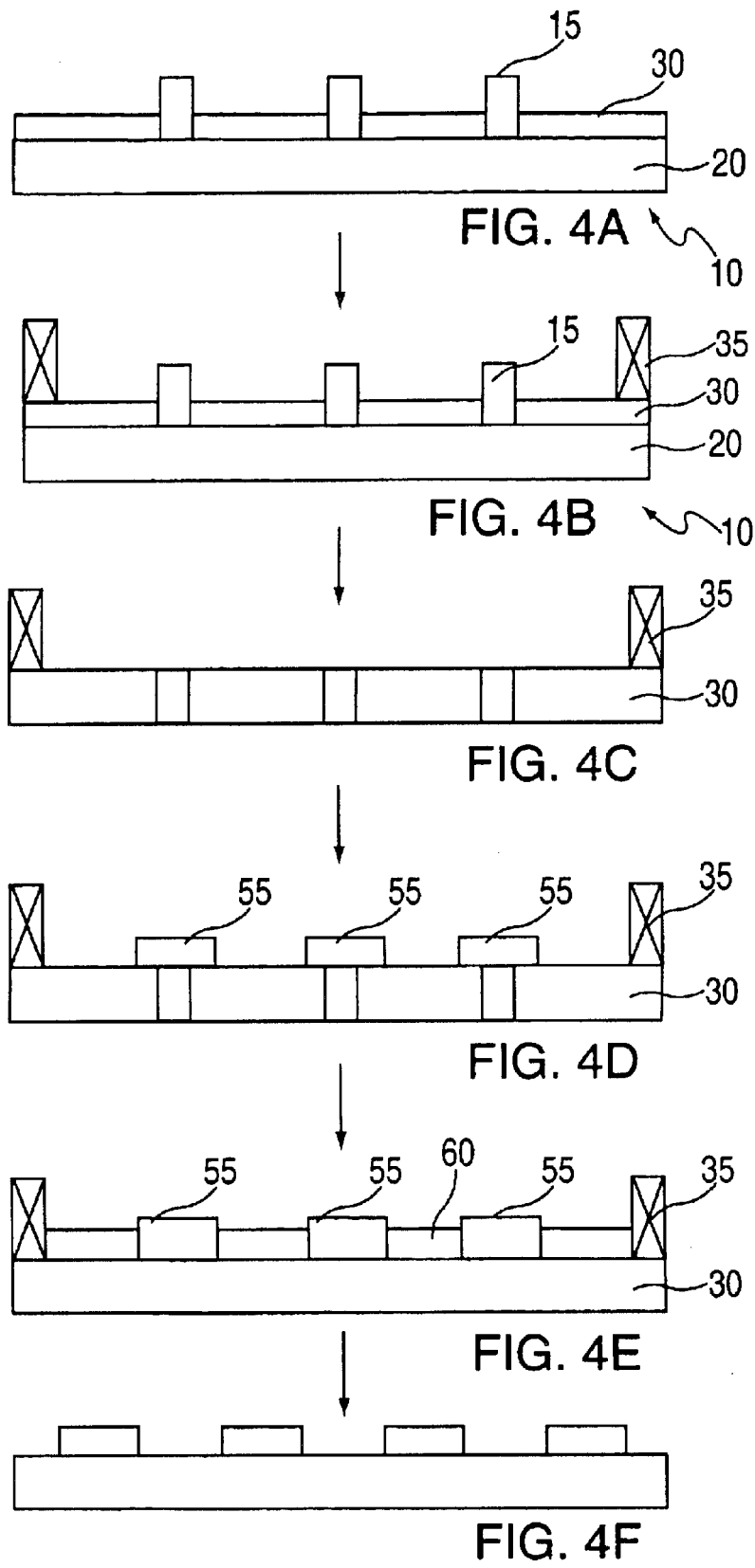

US 6,833,040 B2

APPARATUS AND METHOD FOR HANDLING MEMBRANES

FIELD OF THE INVENTION

The present invention relates generally to methods and apparatus for forming and handling membranes.

BACKGROUND INFORMATION

Membranes, such as elastomeric membranes, have been used in micro-fabrication processes to pattern materials (e.g., electro-luminescent material) on a substrate. One such process is described in detail in Duffy et al., "Patterning Electroluminescent Materials with Feature Sizes as Small as 5 μm Using Elastomeric Membranes as Masks for Dry Lift-Off", *Advanced Materials*, 11, No. 7 (1999) 546–552. Another micro-fabrication process which employs membranes is the use of elastomeric lift-off membranes for the patterning of proteins and cells onto the surfaces of bacteriological Petri dishes, glass, etc. as described, for example, in Ostuni et al., "Patterning Mammalian Cells Using Elastomeric Membranes", *Langmuir*, Jun. 21, 2000. Still another micro-fabrication process is the use of membranes as masks in dry-lift off to produce patterned features of materials such as metals, sol-gels, hydrogels, biological macromolecules and organometallic molecules, such as described in Jackman et al., "Using Elastomeric Membranes as Dry Resists and for Dry Lift-Off", Langmuir 1999, 15, 2973–2984 (Jan. 14, 1999).

Membranes, such as elastomeric membranes, may be fabricated by molding the membrane material using a master mold having a mold pattern that can impart the desired shape to the membrane during molding. For example, in one membrane fabrication process, a pre-determined pattern of photoresist posts is formed on a wafer (e.g.—silicon) using, for example, a process such as photolithography. The elastomeric membrane, or mask, is then created by applying a membrane material to the master that acts as a mold so that, when cured, the membrane has a shape with indentations or through-holes corresponding to the locations of the photoresist posts.

Many applications require very thin membranes—some on the order of 3 microns or less. Membranes that have such small thicknesses are often extremely difficult to handle. For instance, in order to peel such a thin membrane from the master mold, a user may use a microscope to aid in grasping an outer portion of the membrane with a pair of tweezers. To facilitate the removal of the membrane from the master, the user may also apply a solvent, such as ethanol.

However, this grasping may result in tears or other damage. Furthermore, the elastomeric material which comprises the membrane may be very adherent to itself. Thus, the membrane often folds when being handled, and when two surfaces of the membrane contact each other, it is very difficult to separate the surfaces without doing permanent damage to the membrane. However, these very thin membranes have commonly been made in sizes which fit, for example, in a standard Petri dish (approximately 3 inches in diameter). The small surface area of these thin membranes may help to reduce the severity of these problems.

SUMMARY OF THE INVENTION

The present invention, according to one example embodiment thereof, is directed to a handling method for forming a membrane. According to the method, a coating of membrane material on a substrate and a support member are brought into contact. The membrane material is cured so as to form the membrane and to bond the support member to the membrane. The support member has a rigidity that is greater than the membrane, such that, when the support member is bonded to the membrane, the support member maintains at least a portion of the membrane in a substantially taut condition to prevent a portion of the membrane from tearing or folding onto itself.

BRIEF DESCRIPTION OF THE DRAWINGS

FIG. 2 is a schematic illustration of a conventional technique for fabricating a mask (e.g.—membrane).

FIGS. 4A through 4F illustrate schematically a technique for employing a support member as a container to perform additional processes on a membrane, according to an example embodiment of the invention. Specifically, FIG. 4A illustrates a cross-sectional view of a master comprising a substrate with features on a membrane forming surface thereof. FIG. 4B illustrates the support member placed in contact with the membrane at or near an outer perimeter of the membrane. FIG. 4C illustrates the membrane separated from the substrate using the support member. FIG. 4D illustrates a second set of features on the membrane. FIG. 4E illustrates an additional coating of elastomeric material applied to the membrane inside the support member. FIG. 4F illustrates the additional layer cured and having the support member detached from the membrane.

DETAILED DESCRIPTION OF THE INVENTION

Figure 1:
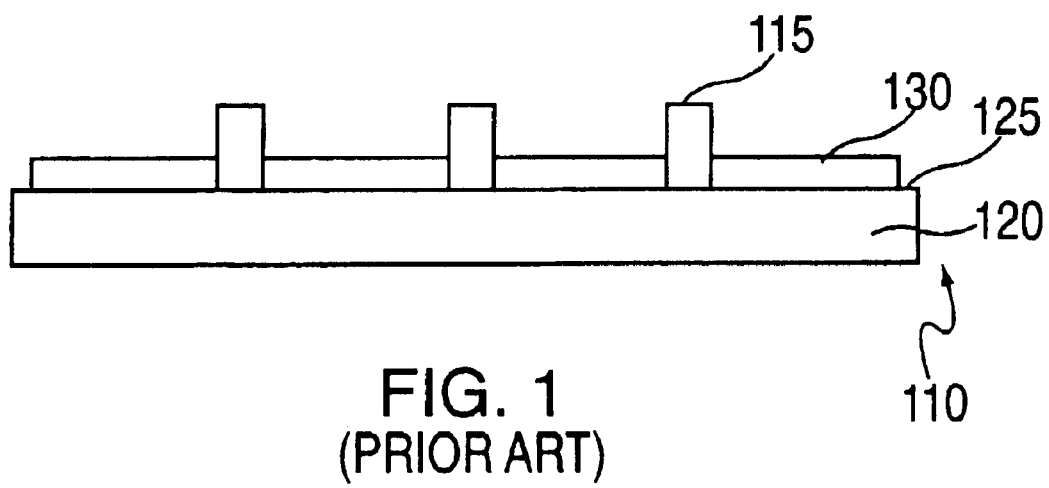
FIG. 1 is a cross-view illustration of a membrane conventionally disposed on a master.
Figure 2A:
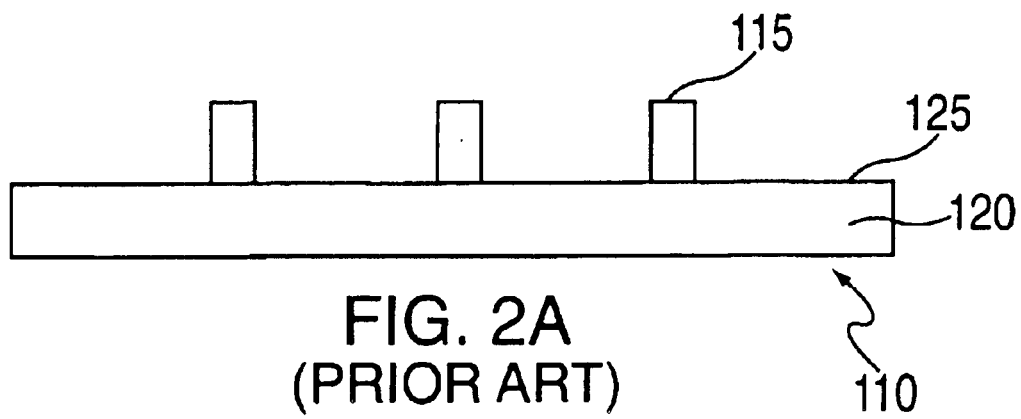
FIG. 2A shows a master with protruding cylindrical posts.
Figure 2B:
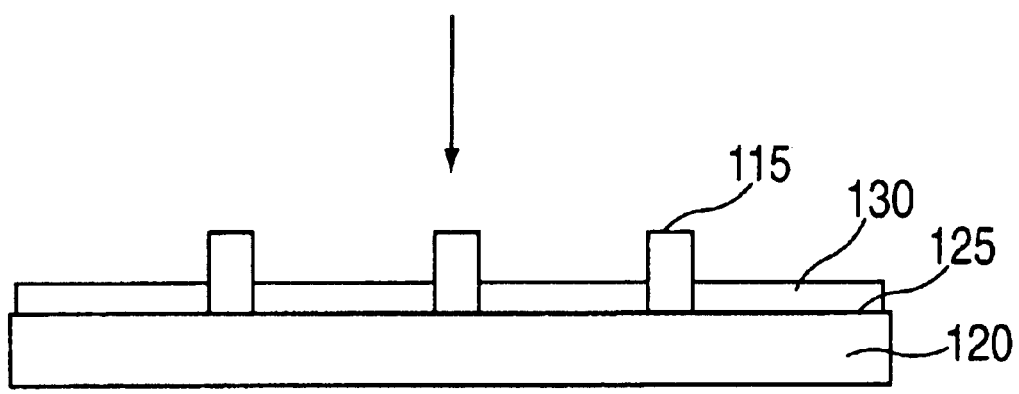
FIG. 2B shows the master with a membrane disposed thereon.

FIGS. 1 and 2A–2C illustrates an assembly 2 for forming a membrane 130. The assembly 2 comprises a master 110 including a substrate 120 and molding features 115 on a membrane forming surface 125 thereof. For example, an array of posts 115 may project from selected locations on the membrane forming surface 125. Those skilled in the art will understand that the posts 115 may be of any shape (e.g., cylindrical, rectangular, etc.). As shown in FIG. 2A, the assembly 2 is oriented so that the membrane forming surface 125 is substantially horizontal and, as shown in FIG. 2B. the membrane material is applied to the membrane forming surface 125 (e.g., by spin casting) to a desired thickness surrounding the features 115 and is cured to form the membrane 130. Those skilled in the art will understand that, to create a membrane 130 with holes 132 extending therethrough, the thickness to which the membrane material is filled is selected to be less than a height of the features 115. To create indentations in a surface of the membrane 130, the thickness to which the membrane material is filled will be greater than a height of the features 115. However, those skilled in the art will understand that a membrane 30 including no through-holes or indentations may also be formed by employing a membrane forming surface 25 of substrate 20 which does not have any features 15 thereon.

Figure 2C:
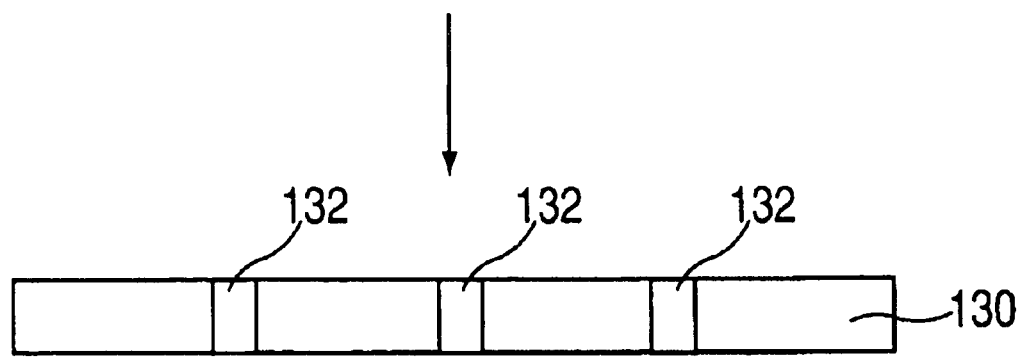
FIG. 2C shows an elastomeric membrane that has been peeled from the master after curing.

Then, as shown in FIG. 2C, the membrane 130 is separated from the membrane forming surface 125 revealing holes 132 extending therethrough at locations corresponding to the positions of the features 115. Those skilled in the art will understand that a membrane 130 may also be formed with no holes extending therethrough by employing an assembly including a membrane forming surface 125 with no features 115 projecting therefrom. The membrane material of which the membrane 130 is formed may, for example, be a polymer. Specifically, the membrane 130 may preferably be formed of a polymeric elastomer, such as polydimethylsiloxane (referred to hereinafter as "PDMS").

Once a membrane 130 has been formed on a substrate 120, it may be subjected to various operations while remaining on the substrate 120. Typically, however, the membrane 130 is lifted from the substrate 120 and placed on a second substrate (not shown) to aid in the creation of additional features or patterns on the second substrate. For example, as previously mentioned, the membrane 130, or at least a portion of the membrane 130, may be employed as a mask in order to transfer a pattern of features on a second substrate which correspond to the features 115 on the first substrate 120. That is, the through-holes 132 of the membrane 130 may be utilized to operate on portions of the surface of the second substrate corresponding to the through-holes 132.

As mentioned above, although various applications may call for membranes of a wide range of thicknesses, many applications require membranes that are very thin. For instance, there are numerous applications, such as patterning electroluminescent materials or micropatterning cell cultures, which employ membranes having thicknesses as small as, for example, 3 microns. The method and apparatus according to an exemplary embodiment of this invention allows the production of such thin membranes while minimizing membrane waste due to tearing and self adhesion by providing a support member bonded to the membrane to maintain at least a portion of the membrane stretched taut and to facilitate the handling of the membrane throughout all of the stages of its fabrication and use. Furthermore, this support member allows the production and handling of thin membranes of larger surface areas without the corresponding increase in waste due to tearing and selfadhesion associated with prior membranes. For example, the method according to the present invention is suitable for the production of membranes sized to fit standard 96 well plates (i.e., a rectangle approximately 3 inches by 5 inches) and for larger sizes as well if desired.

Figure 3A:
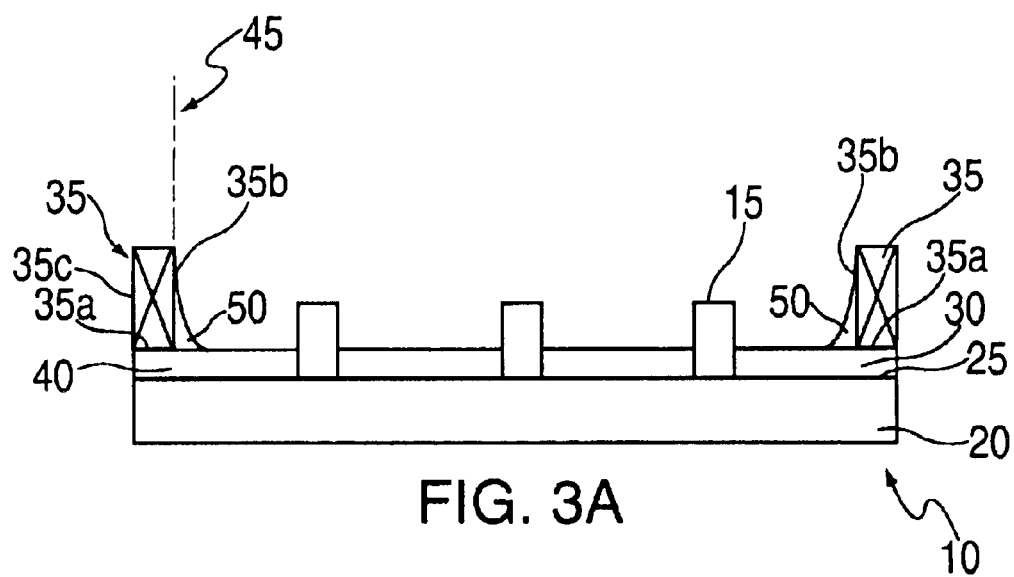
FIG. 3 is a cross-sectional view of a membrane disposed on a master and having a support member attached thereto, in accordance with one example embodiment of the invention.
Figure 3B:
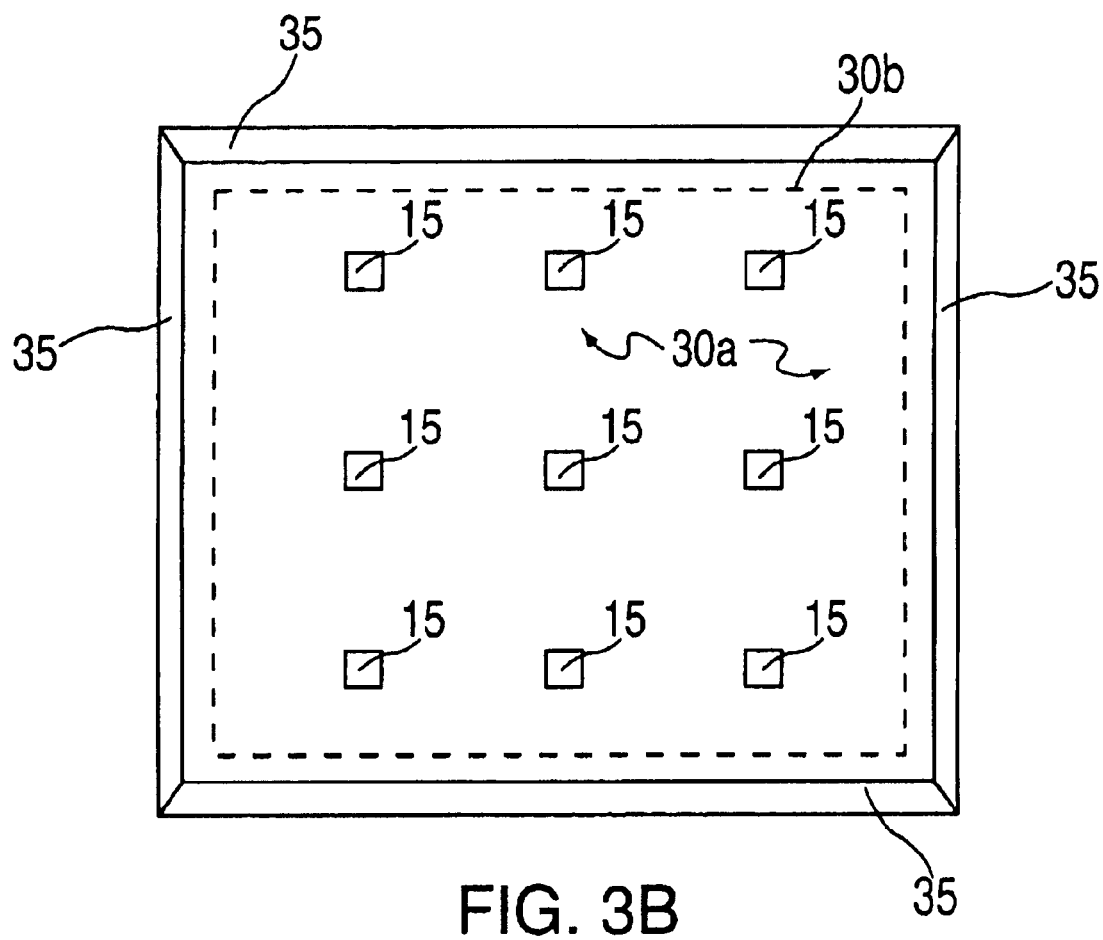

A method of forming a membrane 30 according to an exemplary embodiment of the invention is illustrated in FIG. 3. Specifically, the membrane material is applied to a membrane forming surface 25 and around features 15 to a desired thickness. Then, before the membrane material is cured, a support member 35 is placed in contact with the membrane material at a position outside a perimeter 30b of an active area 30a of the membrane 30 (it is noted that in an alternative embodiment, this step may occur after the membrane material is cured). The active area 30a of the membrane 30 is defined as a portion of the surface area membrane 30 that is to be used for further operations (e.g., that is to be placed on a second substrate to perform operations thereon). As shown in FIG. 3B, the active area 30a corresponds to the portion of the membrane 30 that includes the features 15 of the membrane forming surface 25. The support member 35, in this embodiment, extends around an entire perimeter of the membrane 30 outside the active area 30a. It is appreciated that the support member 35 may contact the membrane 30 at an outside perimeter of the membrane 30, or else may contact the membrane 30 at a perimeter that is smaller than the outside perimeter of the membrane 30. The support member 35 is bonded to the membrane 30 as the membrane material cures so that the support member 35 and the membrane 30 are fixed to one another. The support member 35 may preferably be formed of any material sufficiently rigid and to which the membrane material will bond. Thus when making a membrane of PDMS, the support member 35 may be formed of another polymer, glass, etc.

In addition, the surfaces of the support member 35 which will be in contact with the membrane material may be treated to increase the strength of the bond between the support member 35 and the membrane 30. For example, as would be understood by those of skill in the art, these surfaces may be roughened or coated with a primer to enhance the bond between the support member 35 and the membrane material. If a primer or other chemical, bond-enhancing treatment is to be used on these surfaces, the support member 35 may be formed of a material which will not otherwise bond with the membrane material. For example, for a membrane 30 formed of PDMS, a support member 35 may be formed of glass and the membrane contacting portions of which may be treated with a primer of PDMS.

Alternatively, the bonding properties of the support member 35 may be temporarily altered (e.g., by exposure to an oxygen plasma). As would be understood by those of skill in the art, this would allow the membrane material to bond to a support member 35 formed of a material which would not ordinarily bond with the selected membrane material. In addition, these techniques may promote sealing between surfaces in the absence of auxiliary adhesive (i.e., sealing agents that are separately coated on one or both of the surfaces) and may form a fluid-tight seal that does not dissolve or degrade the components being sealed. For instance, the method of the present invention may involve, according to one example embodiment, pre-oxidizing a bonding portion of the surface of the support member 35 which is in contact with the membrane 30. Alternatively, the method of the present invention may involve pre-oxidizing the portion of the membrane 30a which is in contact with the bonding portion of the surface of the support member 35, or else pre-oxidizing both the membrane 30a and the bonding portion of the surface of the support member 35. Typically, plasma oxidation is performed by placing the surface to be sealed in a plasma oxidation chamber and oxidizing the surface for a predetermined amount of time, e.g., one minute. Once removed from the oxidation chamber, the surfaces are placed in conformal contact with each other, and an irreversible seal may be achieved.

Then, when the properties of the support member 35 have returned to normal, the same or a similar membrane material may be placed in contact with the support member 35 without forming a bond therewith. As will be described below in detail, these processes may allow further operations to be performed on the membrane 30 including the curing of the same or a different membrane material, without bonding this material to the portions of the support member 35 with which this later applied material comes into contact.

Alternatively, the support member 35 may be formed of a material which links with the membrane material as well as with a material to be used in later operations involving the membrane 30, with a release agent being applied to portions of the surface of the support member 35 with which it is not desired that the materials bond.

FIG. 3 shows a master 10 comprising a substrate 20 substantially as described above in regard to FIGS. 2A–2C. The features 15 according to this embodiment may, for example, be an array of posts 15 which may be substantially cylindrical photoresist posts created using photolithography or any other suitable process.

A membrane 30 is formed on the membrane forming surface 25 of the substrate 20 substantially as described above in regard to FIGS. 2A–2C. Attached to membrane 30 is a support member 35, such as a transfer frame. According to one embodiment of the invention, the support member 35 has a rigidity which is greater than a rigidity of membrane 30. In the embodiment shown, the support member 35 comprises a transfer frame attached to the membrane 30 at or near an outer perimeter 40 thereof. Advantageously, the support member 35 has an inner perimeter 45 which is smaller than the outer perimeter 40 to enable the support member 35 to contact or overlap with the membrane 30 in at least two locations. In addition, the inner perimeter 45 of the support member 35 advantageously has dimensions which are at least as large as the dimensions between the outermost of the features 15 so that the support member may be positioned on the membrane 30 without touching or interfering with any of the features 15.

According to one embodiment of the invention, the support member 35 provides additional rigidity to membrane 30 and may also maintain the membrane 30 taut across at least a portion of its surface area. More preferably, the support member 35 maintains the membrane 30 taut across substantially all of its surface area. By providing additional rigidity to the membrane 30, the support member 35 facilitates handling of the membrane 30 with less likelihood of breaking, tearing, folding, or any of the other conventional problems encountered when handling such a membrane.

Figure 6:
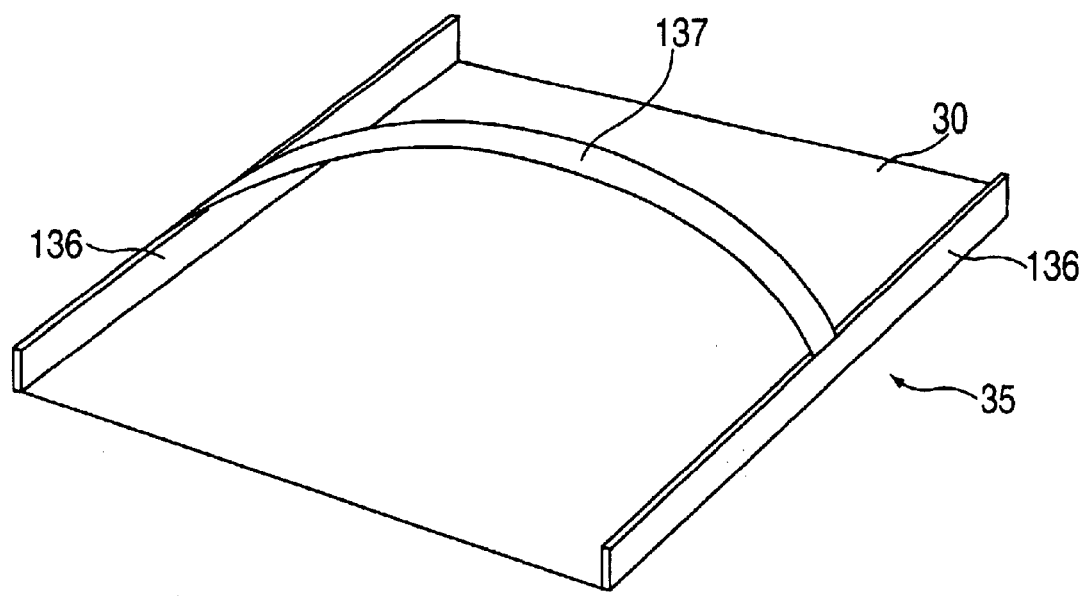
FIG. 6 illustrates a perspective view of a membrane having a support member attached thereto, in accordance with one example embodiment of the invention.

Those skilled in the art will understand that the support member 35 need not extend around an entire perimeter of the membrane 30. For example, as shown in FIG. 6, the support member 35 may include two lateral members 136 extending along opposite sides of a membrane 30 with a cross member 137 mounted therebetween. The cross member 137 maintains the lateral members 136 separate from one another to maintain the membrane 30 taut and may also serve as a handle allowing operators to move and/or manipulate the membrane 30 without damaging it. Of course, those skilled in the art will understand that many such variations are possible so long as the membrane is supported tautly enough to avoid the folding that leads to self-adhesion and so that the rigidity of the support member 35 facilitates handling of the membrane 30.

The present invention, in accordance with one embodiment thereof, provides a method having steps which are performed in order to employ a support member 35 in connection with a membrane 30, and more specifically which are performed when removing the membrane 30 from the master 10. First, a support member, such as the support member 35 illustrated in FIG. 3, is attached to a membrane, such as the membrane 30. Those skilled in the art will understand that the present invention contemplates any method of attachment, and is not intended to be limited to any particular method or system for attachment. As will be discussed in greater detail below, the present invention also contemplates methods by which the support member 35, such as a transfer frame, may be attached to the membrane 30.

As previously described, according to one example embodiment of the invention, the attachment of the support member 35 to the membrane 30 is enhanced by roughening a surface of the support member 35 in contact with the membrane 30 to provide for greater adhesion therebetween. According to another example embodiment of the invention, as described above, the attachment of support member 35 to membrane 30 is enhanced by cleaning, e.g., plasma-treating, a surface of the support member 35 in contact with membrane 30, thereby also providing for greater adhesion therebetween.

Next, the support member and the membrane are transferred from a first location to a second location. In accordance with an example embodiment of the invention as shown, the first location is the substrate 20, and the transfer of the support member 35 and the membrane 30 from the first location to the second location involves separating them from the substrate 20. More particularly, since the support member 35 and the membrane 30 are attached to one another, the user may grasp the support member 35 and/or the membrane 30 and peel or lift them from the substrate 20 together. The user may, according to one embodiment, grasp the support member 35 and/or the membrane 30 with a pair of tweezers, as is commonly employed to lift a membrane alone, or else may employ some other device or method for grasping one or both of the support member 35 and the membrane 30. It is noted that, in accordance with various embodiments of the invention, the support member 35 may be configured (e.g.—with hooks, eyes, handles, etc.) such that, in order for support member 35 and membrane 30 to be concurrently separated from the master, the user need only grasp the support member 35. In this embodiment, the support member 35 is sufficiently attached to the membrane 30 such that, upon peeling or lifting the support member 35 alone from the substrate 20, the membrane 30 is also caused to be peeled or lifted therefrom.

Alternatively, in accordance with other example embodiments of the invention, the support member 35 may be configured such that, in order for the support member 35 and the membrane 30 to be concurrently separated from the substrate 20, the user need grasp only the membrane 30. In this embodiment, the support member 35 provides sufficient additional rigidity to the membrane 30 such that, upon peeling or lifting the membrane 30 alone from the substrate 20, the support member 35 is also caused to be peeled or lifted therefrom.

Once the membrane 30 has been separated from the substrate 20, it may, if desired, be placed onto a second substrate, also referred to as a "target surface", in order to employ the membrane 30 in the performance of a process on the second substrate. In addition, the membrane 30 may be placed on each of a plurality of substrates successively so that membrane 30 may be repeatedly employed in fabricating or processing these substrates. At any point in time, a user may, if desired, detach the support member 35 from the membrane 30, such as by cutting one or more of the membrane 30, the support member 35 and any bonding material 50 (explained in greater detail below) which attaches them to one another, or by employing solvents such as ethanol, or by any other conceivable detachment method.

The present invention, in accordance with one embodiment thereof, also provides a method having steps that are performed so as to attach the support member 35 to the membrane 30. A bonding material 50 is applied to a surface of support member 35. According to one embodiment, the bonding material 50 may be PDMS applied to either the bottom surface 35a or the inner surface 35b of the support member 35. In the embodiment shown, the bottom surface 35a and the inner surface 35b are separated by a corner—however, in one example embodiment, the corner separating these two surfaces is rounded to minimize the likelihood that the sharp edge formed by the corner will tear or rupture the membrane 30.

Next, the support member 35 is positioned so that a surface thereof is in contact with, or is in close proximity to, the membrane 30. According to the embodiment mentioned above whereby a bonding material 50 is applied to the bottom surface 35a of the support member 35, positioning the support member 35 such that the bottom surface 35a is in contact with the membrane 30 enables the bonding material 50 to be placed in immediate contact with the membrane 30. According to the other embodiment mentioned above whereby the bonding material 50 is applied to the inner surface 35b of the support member 35, the support member 35 is placed on or near the membrane 30 such that the bottom surface 35a contacts or is in close proximity to the membrane 30. In this case, the bonding material 50 is applied to the inner surface 35b in a liquid form and is allowed to flow or drip onto the membrane 30. Alternatively, the bonding material 50 is applied to both the bottom surface 35a and the inner surface 35b of the support member 35.

At this point, the bonding material 50 is cured, such as by drying, heating, etc. Once cured, the support member 35 is attached to the membrane 30 at its bottom surface 35a and/or at its inner surface 35b. Of course, it is recognized that, in accordance with alternative embodiments of the invention, the support member 35 may be attached to the membrane 30 by applying the bonding material 50 to a different surface of the support member 35 (such as the outer surface 35c) so long as the different surface is contiguous with, or in close proximity to, the membrane 30 so that the bonding material 50 contacts and is cured for attachment to the membrane 30.

The present invention, in accordance with one embodiment thereof, also provides a method having steps that are performed according to another example embodiment of the present invention to attach the support member 35 to the membrane 30. In this case, the material that comprises the membrane 30, such as elastomeric material, has been applied to substrate 20, but has not yet been allowed to cure. Then, the support member 35 is positioned so that a surface (e.g., the bottom surface 35a) thereof is in contact with the membrane 30. Thus, the bottom surface 35a is placed into contact with the un-cured material that will comprise the membrane 30.

Next, the material that comprises the membrane 30 is cured, such as by drying, heating, etc. During the curing process, the support member 35 is attached to at least one surface of the membrane 30. For instance, when the bottom surface 35a of the support member 35 is placed into contact with the elastomeric material of membrane 30, the curing of the elastomeric material causes the membrane 30 to adhere to the bottom surface 35a of the support member 35.

Figure 5:
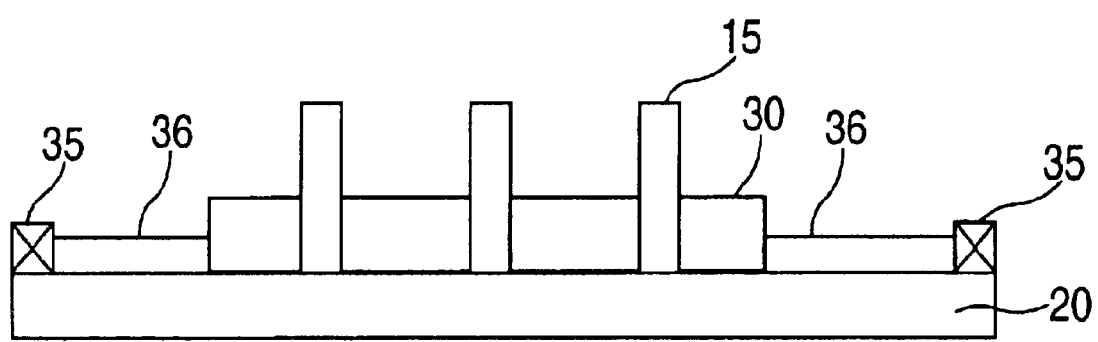
FIG. 5 illustrates a cross-sectional view of a membrane disposed on a substrate and having a support member attached thereto, in accordance with an example embodiment of the present invention.

As previously mentioned, according to one example embodiment, the support member 35 may also maintain the tautness of the membrane 30 across at least a portion of its surface area, and preferably across substantially all of its surface area. FIG. 5 illustrates another example embodiment in which the support member 35 maintains the tautness of the membrane 30 across substantially all of its surface area. By maintaining the tautness of the membrane 30 across substantially all of its surface area, the support member 35 enables the membrane 30 to be handled with less likelihood of breaking, tearing, folding, or any other of the conventional problems encountered when handling a membrane.

More specifically, FIG. 5 illustrates a cross-sectional view of the membrane 30 disposed on the substrate 20 and having the support member 35 attached thereto, in accordance with an example embodiment. In the example embodiment shown, the master 10 also comprises features 15 (e.g., an array of essentially cylindrical photoresist posts) on the membrane forming surface 25 thereof. In the example embodiment shown in FIG. 5, the support member 35 has an inner perimeter 70 which is outside of the outer perimeter 40 of the membrane 30, with the support member 35 being attached to the membrane 30 by a tautness member 36 disposed therebetween. The tautness member 36 may comprise any material which enables the membrane 30, when transferred from a first location to a second location, to maintain its tautness. For instance, the tautness member 36 may comprise elastic bands coupled to membrane 30 at various points around outer perimeter 40 of membrane 30.

According to another example embodiment of the invention, the support member 35 may function as a container, thereby permitting various additional processes to be performed on the membrane 30. An example of such a process employing the support member 35 as a container to perform additional processes on the membrane 30 is shown in FIGS. 4A through 4F. FIG. 4A illustrates a cross-sectional view of the master 10 comprising a substrate 20 with features 15 on a membrane forming surface 25 as described above with membrane material applied thereon to form a membrane 30 extending around the features 15. At this point, the membrane material has not yet cured. Then, as shown in FIG. 4B, a support member 35 is placed in contact with the membrane 30 at or near an outer perimeter 40 thereof membrane 30. As described above, the support member 35 has an inner perimeter 45 smaller than the outer perimeter 40 of the membrane 30 so that it overlaps with the membrane 30 outside of the outermost features 15 so that the support member 35 does not touch or interfere with the features 15. In this example embodiment, the support member 35 is also enclosed around its circumference. In other words, the support member 35 extends all of the way around the membrane 30, although no particular shape of the membrane 30 or of the support member 35 is assumed. The membrane 30 is then cured and the support member 35 is bonded thereto.

FIG. 4C shows an optional additional step in which the membrane 30 is separated from the substrate 20 using the support member 35. Those skilled in the art will understand that, in accordance with an alternate example embodiment, the step of separating the membrane 30 from the substrate 20 as illustrated by FIG. 4C is not performed. Referring now to FIG. 4D, a second set of features 55 are optionally added on membrane 30. These features 55 may comprise any conceivable pattern, and is not intended to be limited to the pattern shown in FIG. 4D. It is also noted that, in accordance with an alternate example embodiment of the invention, the step of adding a second set of features 55 as illustrated by FIG. 4D is not performed. Furthermore, it will be understood that any operation may be performed on all or selected portions of the membrane 30 after the membrane 30 has been cured to prepare the membrane 30 (or selected portions thereof) for further operations. For example, instead of adding second features 55 thereto, selected areas of the membrane 30 may be chemically or otherwise treated to alter the properties thereof.

Referring now to FIG. 4E, additional material 60, such as an additional coating 60 of elastomeric material (e.g., PDMS), is applied to the membrane 30 inside the support member 35. As the support member 35 surrounds the entire perimeter of the membrane 30, the support member 35 functions as a container into which the additional material 60 is added. That is, once the membrane 30 has cured, additional material 60 may be added on top of the membrane 30 (e.g., by spin casting) until a desired thickness of the additional material 60 has been obtained. As shown in FIG. 4E, the additional material 60 surrounds the second features 55 and bonds them to the membrane 30 at their respective positions. Those skilled in the art will understand that the additional material 60 may be formed of any thickness up to a maximum thickness defined by a minimum height of the support member 35. Thus, in this embodiment, the minimum height of the support member is greater than a height of the top of the membrane 30.

The additional material 60 is then permitted to cure and the support member 35 is detached from the membrane 30, as shown in FIG. 4F. Of course, any conceivable pattern of features 55 (or lack of pattern) may be employed in the application of the additional material 60, and the example embodiment of the invention shown is not intended to be limited to the pattern shown herein. In addition, while the example embodiment shows an additional layer of elastomeric material being added on the membrane 30, any process may be performed in which it may be advantageous to utilize the support member 35 as a container, and any number of such processes may be performed successively, either consecutively or otherwise, and the example embodiment shown is not intended to be limited to the process or processes discussed or shown herein. It is also noted that, in accordance with another example embodiment of the present invention, additional material is added into just the through-holes of the membrane 30. In this manner, each through-hole forms a well, e.g., a microwell, into which additional material may be added.

Thus, the several aforementioned objects and advantages of the present invention are most effectively attained. Those skilled in the art will appreciate that numerous modifications of the exemplary embodiment described hereinabove may be made without departing from the spirit and scope of the invention. Although a single exemplary embodiment of the present invention has been described and disclosed in detail herein, it should be understood that this invention is in no sense limited thereby and that its scope is to be determined by that of the appended claims.

What is claimed is:

1. A method for applying a pattern to a target surface the method comprising the steps of:

applying a coating of membrane material over a selected portion of a substrate, the substrate imparting the pattern to the membrane material;

positioning a support member in contact with an outer perimeter of the membrane material;

curing the membrane material to bond the support member to the membrane, wherein, when bonded to the membrane, the support member, which has a rigidity which is greater than the membrane, maintains at least a portion of the membrane in a substantially taut condition to prevent that portion of the membrane from folding onto itself;

removing the membrane from the substrate; and employing the membrane to apply the pattern to the target surface.

2. The method according to claim 1, wherein the substrate includes a plurality of features thereon corresponding to the first pattern, the features including one of depressions and projections.

3. The method according to claim 1, wherein the step of removing the membrane from the substrate includes using the support member to remove the membrane from the substrate.

4. The method according to claim 1, wherein the membrane includes through-holes, and wherein the method further comprises the step of adding the additional material into the through-holes.

5. A method for applying a pattern to a target surface, the method comprising the steps of:

applying a coating of membrane material over a selected portion of a substrate, the substrate imparting the pattern to the membrane material;

positioning a support member in contact with an outer perimeter of the membrane material;

curing the membrane material to bond the support member to the membrane, wherein, when bonded to the membrane, the support member, which has a rigidity which is greater than the membrane, maintains at least a portion of the membrane in a substantially taut condition to prevent that portion of the membrane from folding onto itself;

removing the membrane from the substrate;

separating the membrane from the support member; and employing the membrane to apply the pattern to the target surface.

6. A method for applying a pattern to a target surface, the method comprising the steps of:

applying a coating of membrane material over a selected portion of a substrate, the substrate imparting the pattern to the membrane material;

positioning a support member in contact with an outer perimeter of the membrane material, wherein the support member extends around an entire perimeter of the membrane and has a height which is greater than a height of a top surface of the membrane, so as to form a well;

curing the membrane material to bond the support member to the membrane, wherein, when bonded to the membrane, the support member, which has a rigidity which is greater than the membrane, maintains at least a portion of the membrane in a substantially taut condition to prevent that portion of the membrane from folding onto itself;

removing the membrane from the substrate;

adding additional material into the well; and employing the membrane to apply the pattern to the target surface.

7. The method according to claim 6, further comprising the step of, prior to adding the additional material into the well, applying a second pattern to a surface of the membrane within the well.

8. The method according to claim 6, wherein the second pattern includes at least one of depressions and projections.

9. A method for handling a membrane, the method comprising the steps of:
- at a first location, attaching a support member to the membrane by positioning the transfer frame, when the membrane is in an un-cured state, such that a surface of the transfer frame is in contact with the membrane and then curing the membrane, the support member having a rigidity which is greater than the rigidity of the membrane; and
- transferring the support member and the membrane from the first location to a second location.

10. The method of claim 9, wherein the first location comprises a substrate.

11. The method of claim 10, wherein the substrate has at least one feature.

12. The method of claim 11, wherein the substrate has a plurality of the features forming a pattern for creating a corresponding pattern of through-holes in the membrane.

13. The method of claim 12, wherein the pattern of features has an outer perimeter, and the support member has an inner perimeter which, when the support member is attached to the membrane, is outside the outer perimeter of the features.

14. The method of claim 9, wherein the membrane is elastomeric.

15. The method of claim 14, wherein the elastomeric membrane comprises poly(dimethylsiloxane).

16. The method of claim 15, wherein the step of attaching comprises the steps of:
- applying a bonding material to a surface of the transfer frame;
- positioning the transfer frame so that a surface of the transfer frame is in contact with the membrane; and
- curing the bonding material.

17. The method of claim 16, wherein the bonding material comprises PDMS.

18. The method of claim 16, further comprising the steps of, prior to attaching the support member to the membrane, treating a bonding portion of a surface of the support member.

19. The method of claim 18, wherein the treating step comprises exposing the support member to a plasma.

20. The method of claim 19, wherein the plasma is an oxygen plasma.

21. The method of claim 15, wherein the step of attaching comprises the steps of:
- when the membrane is in an un-cured state, positioning the transfer frame so that a surface of the transfer frame is in contact with the membrane;
- curing the membrane.

22. The method of claim 21, further comprising the step of, prior to attaching the support member to the membrane, treating a bonding portion of a surface of the support member.

23. The method of claim 22, wherein the treating step comprises exposing the support member to a plasma.

24. The method of claim 23, wherein the plasma is an oxygen plasma.

25. The method of claim 9, wherein the step of transferring the support member and the membrane from the first location to a second location includes the step of separating the membrane from the substrate.

26. The method of claim 12, wherein the second location is a target surface, and wherein the method further comprises the step of processing the membrane on the target surface so that features corresponding to the through-holes of the membrane are formed on the target surface.

27. The method of claim 9, wherein the support member functions as a container.

28. A method for handling a membrane, the method comprising the steps of:
- at a first location, attaching a support member to the membrane, the support member having a rigidity which is greater than the rigidity of the membrane; and
- transferring the support member and the membrane from the first location to a second location; and
- at the second location, detaching the support member from the membrane.

29. A method for handling a membrane, the method comprising the steps of:
- at a first location, attaching a support member to the membrane, the support member functioning as a container and having a rigidity which is greater than the rigidity of the membrane; and
- transferring the support member and the membrane from the first location to a second location; and
- applying an elastomeric material to a top surface of the membrane.

30. The method of claim 29, further comprising the step of, before applying the elastomeric material, disposing at least one feature on the top surface of the membrane.

* * * * *